(12) United States Patent
Kline et al.

(10) Patent No.: US 11,175,803 B2
(45) Date of Patent: Nov. 16, 2021

(54) REMOTE GUIDANCE FOR OBJECT OBSERVATION

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/269,834

(22) Filed: Feb. 7, 2019

(65) Prior Publication Data

US 2020/0257417 A1    Aug. 13, 2020

(51) Int. Cl.
| | | |
|---|---|---|
| *G06F 3/0481* | (2013.01) |
| *G06F 3/0346* | (2013.01) |
| *G06F 3/0338* | (2013.01) |
| *G06F 3/01* | (2006.01) |
| *G06T 7/50* | (2017.01) |
| *G06F 3/0484* | (2013.01) |
| *G01C 19/00* | (2013.01) |
| *G06F 40/169* | (2020.01) |

(52) U.S. Cl.
CPC .......... *G06F 3/0484* (2013.01); *G01C 19/00* (2013.01); *G06F 40/169* (2020.01)

(58) Field of Classification Search
CPC ...... G06F 3/0484; G06F 40/169; G06F 3/016; G06F 3/011; G01C 19/00; G01C 21/165; G01C 21/02; G01C 1/00
See application file for complete search history.

(56) References Cited

U.S. PATENT DOCUMENTS 5,764,344 A * 6/1998 Taniguchi ................ G01C 3/04
356/3.16
6,046,712 A 4/2000 Beller et al.
(Continued)

OTHER PUBLICATIONS

Beringer, D., et al., "Helicopter Pilot Use Of a See-Through, Head-Mounted Display With Pathway Guidance for Visually Guided Flight: Observations of Navigation Behavior and Obstacle Avoidance", Proceedings of Human Factors And Ergonomics Society, 53 Annual Meeting, Oct. 1, 2009, pp. 26-30.
(Continued)

*Primary Examiner* — Jennifer N Welch
*Assistant Examiner* — K C Chen
(74) *Attorney, Agent, or Firm* — Cantor Colburn LLP; Tihon Poltavets (57) ABSTRACT

A technique relates to remote guidance to observe an object. A remote user device receives remote viewing information from a guiding user device associated with a first location, the remote viewing information defining a first perspective at the first location for observing the object in an atmosphere. The remote user device translates the remote viewing information into local viewing information, the local viewing information defining a second perspective at a second location for observing the object in the atmosphere, the first location being different from the second location. The remote user device guides a view of the remote user device to the object in the atmosphere relative to the second location according to the local viewing information.

15 Claims, 8 Drawing Sheets

(56) References Cited

U.S. PATENT DOCUMENTS

| | | | |
|---|---|---|---|
| 8,160,812 B1* | 4/2012 | Ng | G01C 21/3682 |
| | | | 340/995.1 |
| 8,750,566 B2 | 6/2014 | Guan et al. | |
| 9,459,457 B2 | 10/2016 | Murray et al. | |
| 9,619,021 B2 | 4/2017 | Cho et al. | |
| 9,690,367 B2 | 6/2017 | Pedrotti et al. | |
| 9,691,181 B2 | 6/2017 | Watson et al. | |
| 9,696,798 B2 | 7/2017 | Kritt et al. | |
| 2004/0109007 A1* | 6/2004 | Griss | H04N 5/23203 |
| | | | 345/629 |
| 2006/0103926 A1* | 5/2006 | Meyers | G02B 23/16 |
| | | | 359/430 |
| 2008/0225137 A1* | 9/2008 | Kubo | H04N 5/23203 |
| | | | 348/231.2 |
| 2015/0035726 A1 | 2/2015 | Li et al. | |
| 2015/0049113 A1 | 2/2015 | Rahman et al. | |
| 2015/0169070 A1 | 6/2015 | Harp et al. | |
| 2016/0025981 A1 | 1/2016 | Burns et al. | |
| 2016/0065896 A1 | 3/2016 | Chow | |
| 2016/0358383 A1* | 12/2016 | Gauglitz | G06T 19/006 |

OTHER PUBLICATIONS

Higuch, K., et al.; "Can Eye Help You?: Effects Of Visualizing Eye Fixations on Remote Collaboration Scenarios for Physical Tasks", CHI'16 ACM Conference On Human Factor In Computing Systems, May 7-12, 2016, pp. 5180-5190.

Pollock, B. et al., "The Right View from the Wrong Location: Depth Perception in Stereoscopic Multi-User Virtual Environments", IEEE Transactions On Visualization and Computer Graphics, vol. 18, No. 4, Apr. 2012, pp. 581-588.

Zhang, Y. et al., "Look together: using gaze for assisting co-located collaborative Search", Personal And Ubiquitous Computing, vol. 21, Issue 1, Feb. 1, 2017, pp. 173-186.

* cited by examiner

REMOTE GUIDANCE FOR OBJECT OBSERVATION

BACKGROUND

The present invention generally relates to computing systems, and more specifically, to computer devices, computer-implemented methods, and computer program products configured for remote guidance to view objects in the sky.

In electronics, a remote control is a component of an electronic device used to operate the device from a distance, usually wirelessly. For example, in consumer electronics, a remote control can be used to operate devices from a short distance. A remote control is primarily a convenience feature for the user and can allow operation of devices that are out of convenient reach for direct operation of controls. In some cases, remote controls allow a person to operate a device that they otherwise would not be able to reach.

SUMMARY

Embodiments of the invention are directed to computer-implemented method for remote guidance to observe an object. A non-limiting example of the method includes receiving, by a remote user device, remote viewing information from a guiding user device associated with a first location, the remote viewing information defining a first perspective at the first location for observing the object in an atmosphere. The method includes translating, by the remote user device, the remote viewing information into local viewing information, the local viewing information defining a second perspective at a second location for observing the object in the atmosphere, the first location being different from the second location. Also, the method includes guiding, by the remote user device, a view of the remote user device to the object in the atmosphere relative to the second location according to the local viewing information Embodiments of the invention are directed to device for remote guidance to observe an object. A non-limiting example of the device includes a processor, and memory coupled to the processor and comprising computer-executable instructions that, when executed by the processor, cause the processor to perform a method. A non-limiting example of the method includes receiving, by the processor, remote viewing information from a guiding user device associated with a first location, the remote viewing information defining a first perspective at the first location for observing the object in an atmosphere. The method includes translating, by the processor, the remote viewing information into local viewing information, the local viewing information defining a second perspective at a second location for observing the object in the atmosphere, the first location being different from the second location. Also, the method includes guiding, by the processor, a view of the device to the object in the atmosphere relative to the second location according to the local viewing information.

Embodiments of the invention are directed to a computer program product for remote guidance to observe an object. The computer program product include a computer readable storage medium having program instructions embodied therewith, where the computer readable storage medium is not a transitory signal per se, the program instructions executable by a remote user device to cause the remote user device to perform a method. A non-limiting example of the method includes receiving, by the remote user device, remote viewing information from a guiding user device associated with a first location, the remote viewing information defining a first perspective at the first location for observing the object in an atmosphere. The method includes translating, by the remote user device, the remote viewing information into local viewing information, the local viewing information defining a second perspective at a second location for observing the object in the atmosphere, the first location being different from the second location. Also, the method includes guiding, by the remote user device, a view of the remote user device to the object in the atmosphere relative to the second location according to the local viewing information.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Turning now to an overview of technologies that are more specifically relevant to aspects of the invention, many people might use a telescope or other gazing device to view objects in the sky. There was a time when the NASA™ International Space Station (ISS) was visible in a country. Information including coordinates were provided about how the ISS would be visible in the sky over certain locations in the country. Particularly, there was one small dot moving from one corner to another corner of the sky. In this scenario, if one user is guiding another user from a remote location about the position and movement of the ISS in the sky, it will be difficult for the user to explain the path and position of the ISS. Even though the coordinates are given, it is still difficult for many users to follow. For example, one user who is located in a state/province in the country attempts to provide telephonic guidance to another user located in another state/province in the same country (e.g., about 950 miles away) about the movement and real-time position of the ISS in the sky. Both users will have difficulty following each other regarding the location, movement, etc., of the ISS. This is a similar type of problem that would occur while watching any star or constellation of stars.

Turning now to an overview of the aspects of the invention, one or more embodiments of the invention provide user devices having displays to which coordinate remote guidance about the position, movement, and/or pattern of objects present in the sky. As such, the first user can remotely guide a second user to view the same object in the sky being viewed by the first user, when both the first and second users have their own user devices.

Figure 1:
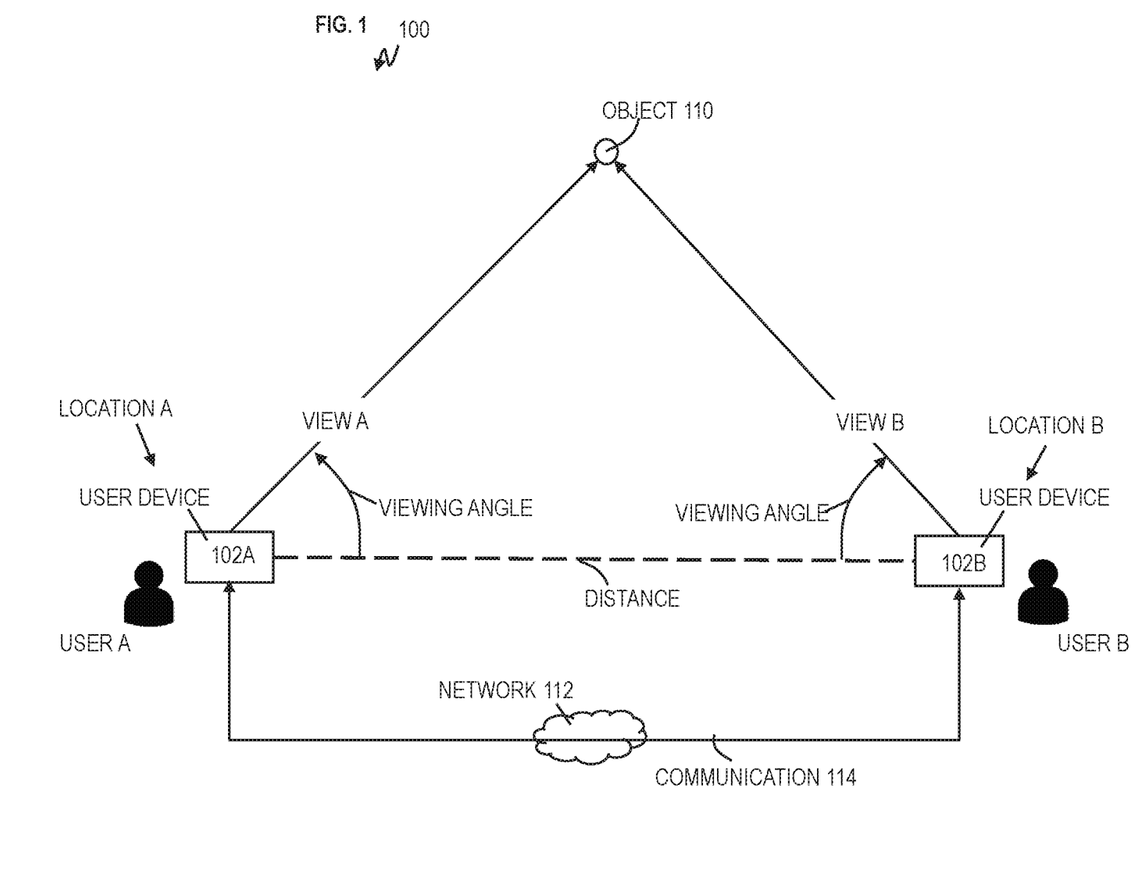
FIG. 1 depicts a communication system/network for remote guidance to view objects using user devices according to embodiments of the invention.

Turning now to a more detailed description of aspects of the present invention, FIG. 1 depicts a communication system/network 100 for remote guidance to view objects in the sky using user devices according to embodiments of the invention. The communication system/network 100 includes user device 102A utilized by user A at location A and user device 102B utilized by user B at location B. The user devices 102A and 102B can generally be referred to as user devices 102. User A and user B are at two different locations. For example, user device 102A of user A might be in a different neighborhood, city, state, country, etc., form user device 102B of user B. Location A and location B can be separated by a distance of 10 miles, 20 miles, 100 miles, 1000 miles, 200 miles, and so forth. Location A can be on a separate continent from Location B and across multiple time zones. User device 102A is configured to communicate with user device 102B through one or more communication links 114. The communication may be over one or more networks 112, which can be wired, wireless, and/or both. The networks 112 can include cellular networks, landlines, cable networks, satellite networks, fiber optic network, the Internet, WiFi networks, etc.

For explanation purposes and ease of understanding, scenarios illustrate user A operating user device 102A as the guiding user/user device and illustrate user B operating user device 102B as the remote user/user device. For example, user B operating user device 102B can be the receiving user device which receives remote guidance from user A operating user device 102A. The scenario depicts user A remotely guiding user B to view the object 110 in the sky from a remote location, with assistance from their respective user devices 102A and 102B. It should be appreciated that other scenarios could depict user B remotely guiding user A to view the object 110.

Figure 2:
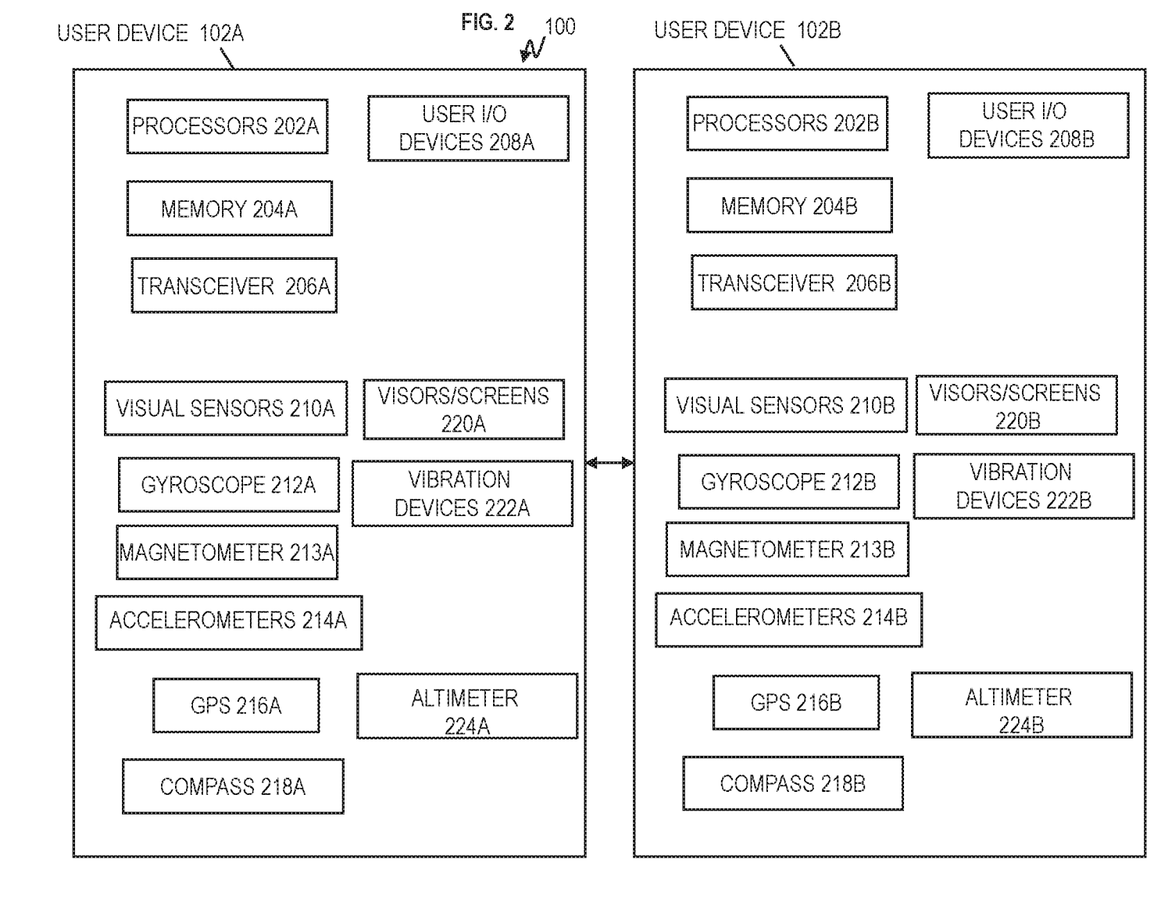
FIG. 2 depicts example user devices according to embodiments of the invention.

FIG. 2 depicts examples of the user devices 102A and 102B according to embodiments of the invention. The user devices 102A and 102B each include one or more processors 202A and processors 202B. The processors 202A and 202B are configured to execute computer-executable instructions, which could be one or more software application executing in memory 204A and memory 204B, respectively. The user devices 102A and 102B can include transceiver 206A and transceiver 206B, respectively. The transceivers 206A and 206B allow the user devices 102A and 102B to communicate with one another over communications links 114, as well as communication with other user devices. The user devices 102A and 102B include user input/output devices 208A and 208B, respectively, which include cameras, display, speakers, microphone, touchpad, joystick, buttons, etc.

The user devices 102A and 102B can include multiple types of visual sensors 210A and visual sensors 210B for respectively viewing the object 110 in the sky. For example, the visual sensors 210A and 210B can include visual wavelength/frequency sensors, ultraviolet (UV) sensors, x-ray sensors, radar sensors (including a transmitter and receiver), etc. The visual sensors 210A and visual sensors 210B can include and/or be coupled to visors/screens 220A and 220B, respectively, such that the sensor information of the visual sensors 210A and 210B can be superimposed on the visors/screen 220A and 220B respectively, as the user views the object 110 and anything else in the field of view.

The user devices 102A and 102B include gyroscope 212A and gyroscope 212B, respectively, which can determine movement or motion of the respective user devices 102A and 102B, along with direction. The gyroscopes 212A and 212B can be used to determine the altitude, degrees of inclination, and viewing angle of the users A and B as utilizing user devices 102A and 102B, respectively (e.g., as they view the object 110). The field of view is the view as seen by the visual sensors 210A and 210B (and/or the visors) as the user A and user B respectively look (forward) into the real world, such as looking at the object 110 in the sky. The viewing angle is the angle taken from the horizontal surface such as the ground (i.e., earth) to an object in the sky such as the object 110.

The user devices 102A and 102B can include accelerometers 214A and accelerometers 214B which can determine movement and acceleration in various directions. The user devices 102A and 102B can include magnetometers 213A and 213B, respectively, to determine direction with respect to magnetic north pole and inclination.

The user devices 102A and 102B include GPS devices 216A and 216B, which can determine their respective locations on the ground and sea. Also, the user devices 102A and 102B can include a compass 218A and compass 218B, respectively, which can determine the present location (along with GPS devices 216A and 216B) of the respective user devices 102A and 102B along with the direction the respective users A and B are viewing. The user devices 102A and 102B include altimeter devices 224A and 224B, which is an instrument used to measure the altitude of an object above a fixed level.

The gyroscopes, accelerometers, and magnetometers (and/or altimeters) can be integrated into what is conventionally called an inertial measurement unit (IMU). The IMU can, in turn, be part of an "attitude heading reference system" (AHRS) that computes (e.g., using the onboard processors 202A and 202B) a pointing direction of the user device from IMU sensor data, possibly together with location information (e.g., from the respective GPS devices 216A and 216B).

The user devices 102A and 102B are devices that can move with the direction of the respective users A and B, for example, as the users look to the sky in search of one or more objects. The user devices 102A and 102B can be a head mounted display device, which can include helmets, partial helmets, prosthetic type devices, and other wearable devices, and the head mounted display can be binocular and/or monocular. The visors/screens 220A and 220B can be electronic display screen (such as light-emitting diode display (LED), electroluminescent display (ELD), liquid crystal display (LCD), thin-film transistor display (TFT), organic light-emitting diode display (OLED), quantum dot display (QLED), etc.), transparent or semitransparent lens which can have images projected on the lens, and/or a combination of both. One eye can view the electronic display screen while the other eye can view the transparent lens. Additionally, the head mounted display can display only computer-generated imagery (CGI) (also referred to as sensor-based imagery from visual sensors 210A), only live imagery from the physical world, and/or a combination. In some cases, the head mounted display can allow a CGI to be superimposed on the real-world view. This is sometimes referred to as augmented reality or mixed reality. Combining real-world view with CGI can be done by projecting the CGI through a partially reflective mirror and viewing the real world directly. This method is often called optical see-through. Combining real-world view with CGI can also be done electronically by accepting video from a camera (or visual sensors 210A and 210B) and mixing it electronically with CGI. This method is often called video see-through.

The user devices 102A and 102B include a plurality of vibration devices 222B and a plurality of vibration devices 222B, respectively, which can be positioned around the visors/screens 220A and 220B. The vibration devices 222A and 222B are configured to vibrate on a portion of the user devices 102A and 102B, in order to indicate to the respective user that he needs to turn his head in the direction of the vibration to view the object.

Figure 3:
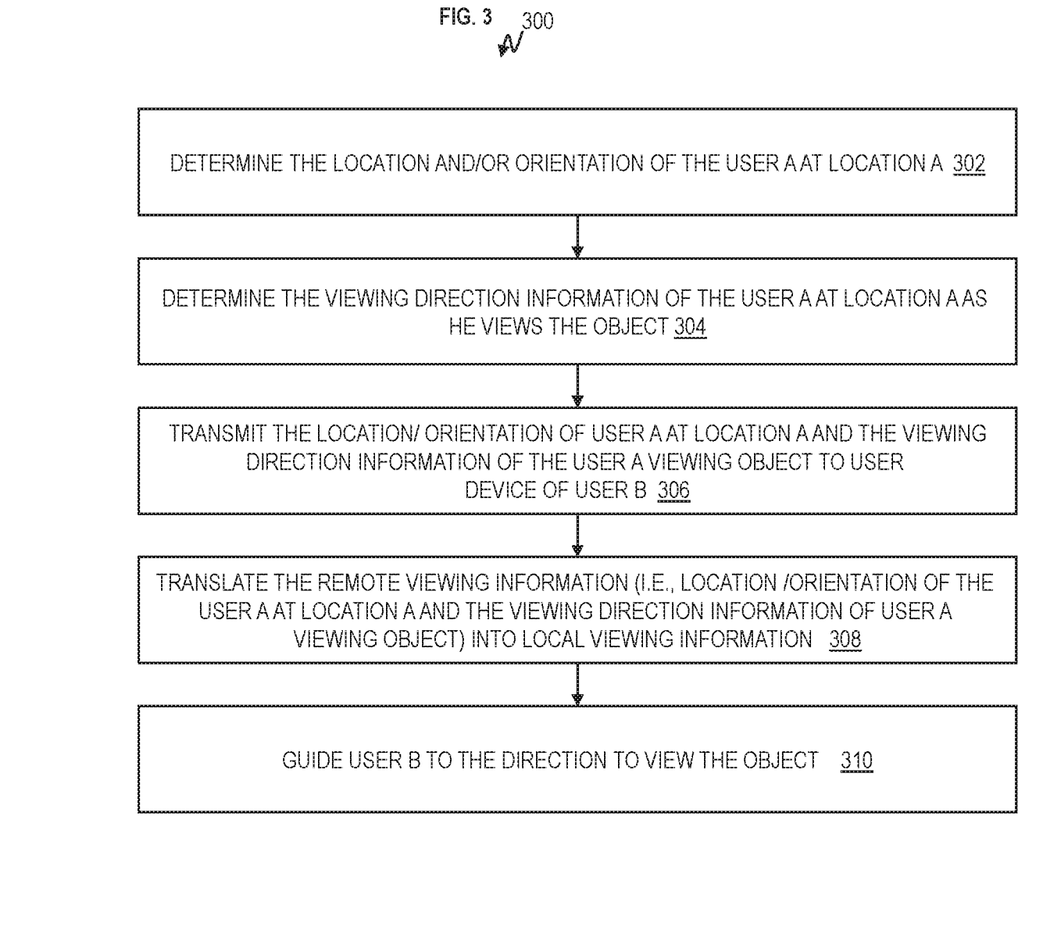
FIG. 3 depicts a flowchart for a guiding user device remotely guiding a receiving user device to view one or more objects according to embodiments of the invention.

There are various ways of providing real-time guidance for the guiding user A on user device 102A to remotely guide the receiving user B on user device 102B. FIG. 3 depicts a flowchart 300 of the guiding user A remotely guiding the receiving user B to view one or more objects 110 in the sky via user devices 102A and 102B, according to embodiments of the invention. At block 302, the user device 102A is configured to determine the location/orientation of the user A at location A. The location and orientation of user A can be determined by using measurements from GPS device 216A, compass 218A, and/or magnetometer 213A, such that the processor 202A can determine location information of user A utilizing user device 102A. The location information of user A can include x, y, and z coordinates, latitude, longitude, etc., all which identify the location A of user A on the earth or sea.

Figure 8:
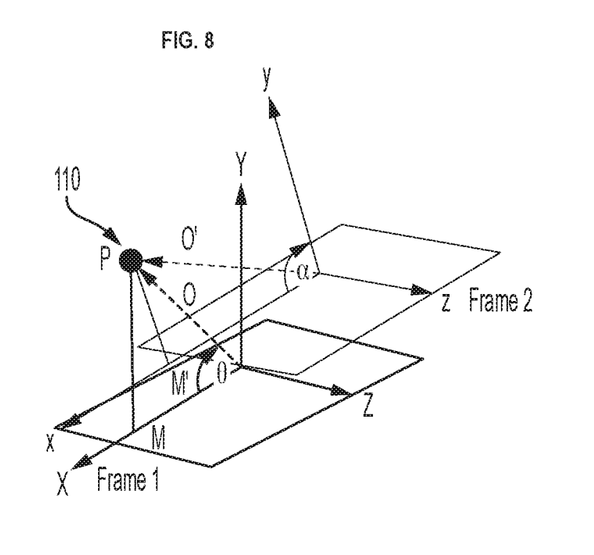
FIG. 8 depicts an example to determine the viewing direction information to an object P for one reference frame given another reference frame according to embodiments of the invention.

At block 304, the user device 102A is configured to determine the viewing direction information of user A at location A as he views the object 110, for example, which can be satellites, stars, airplane, constellation, cloud, asteroid, etc. User A can view the object 110 through the visors/screens 220A along with measurements and data from the visual sensors 210A. User A can mark/identify the desired object 110 using the user I/O device 208A, for example, by using eye movement, finger movement, voice commands, etc., which are processed by the processor 202A. It should be appreciated that user A can select more than one object to marked, such as a constellation of stars (e.g., the Big Dipper, the Little Dipper, etc.). Also, user A can take a snapshot of his view for calculation of the present viewing direction information of user A viewing the object 110. The viewing direction information can include a viewing angle with respect to location A of user A and the location of the object 110 (along with an approximated distance away), azimuth, and/or x, y, and z coordinates of the object 110 in the sky from the perspective of location A. The processor 202A is configured to utilize the compass 218A, accelerometers 214A, gyroscope 212A, etc. The location/orientation of user A at location A and the viewing direction information of user A viewing object 110 can be stored in memory 204A. FIG. 8 depicts an example to determine the viewing direction information to an object P (e.g., object 110) according to embodiments of the invention. Particularly, the technique for the device 102A of user A to establish celestial coordinates of example object P in the night sky is for the user device 102A to obtain the user A's GPS coordinates (via GPS device 216A) and facing direction (via electronic compass device 218A) together with an altitude measurement (via altimeter device 224A). These three parameters, GPS coordinates, compass heading, and altitude (or tilt) provide all the spatial coordinates required to establish the coordinates of object P with respect to user A. This may be expanded to include temporal reference (as determined by processors 202A), yielding a temporal-spatial coordinate of object P with respect to user A by setting the date and time-stamp of when the subject observation occurred. The determined location/orientation information and viewing direction information of user A can be utilized by user B as discussed further herein.

At block 306, the user device 102A is configured to transmit the location/orientation information of user A at location A and the viewing direction information of the user A viewing object 110 to user device 102B. This location/orientation information and viewing direction information of user A at location A can be referred to as remote viewing information which defines a perspective at the location A for observing the object 110 in the atmosphere with user device 102A.

At block 308, the user device 102B is configured to translate the remote viewing information (i.e., location and/or orientation of the user A at location A and the viewing direction information of user A viewing object 110) into local viewing information for user device 102B. The local viewing information defines a perspective at location B for observing the object 110 in the atmosphere based on the remote viewing information from user device 102A. As analogously discussed above for user device 102A, the user device 102B is configured to determine its location/orientation of the user B at location B. The location and orientation information of user B can be determined by using GPS device 216B, compass 218B, and/or magnetometer 213B, such that the processor 202B can determine location information of user B utilizing user device 102B. The location information of user B can include x, y, and z coordinates, latitude, longitude, etc., which identify the location B of user B on the earth or sea.

Additionally, the user device 102B (via processors 202B executing instruction in memory 204B) is configured to translate the viewing direction information of user A viewing object 110 into coordinates/direction/viewing angle/azimuth (i.e., viewing direction information) for user B to view the object 110, given the location B of user B. Further regarding FIG. 8, two frames (x, y, z coordinate systems), frame 1 and frame 2, are depicted where frame 1 can refer to viewing the object 110 from the device 102A of user A and frame 2 can refer to viewing the object 110 from the device 102B of user B. Accordingly, when observers A and B observe celestial object P from two location, A and B, two frames of reference are established such that:

$$x = OP \cos(\theta + \alpha),$$ (Equation 1)

$$x = X \cos \theta - Y \cos \theta, \text{ and}$$ (Equation 2)

$$y = X \sin \theta + Y \cos \theta.$$ (Equation 3)

Therefore, user device 102B is configured to determine object P's x, y coordinates in reference frame 2 from the coordinate data in reference frame 1, given the two GPS locations, along with the compass heading and altitude from frame 1 (of user A).

Further, given different time zones, the user device 102B (via processors 202B executing instruction in memory 204B) is configured to translate the viewing direction information of user A viewing object 110 into coordinates/direction/viewing angle/azimuth (i.e., viewing direction information) for user B to view the object 110 at a time that is better for user B. For example, locations A and B can have a time difference such that day and night are opposite for each location. As such, the user device 102B is configured to determine the best time, e.g., night to view stars, to view the object 110 such that the object is noticeable to the user B, which might be daytime for user A.

Figure 4:
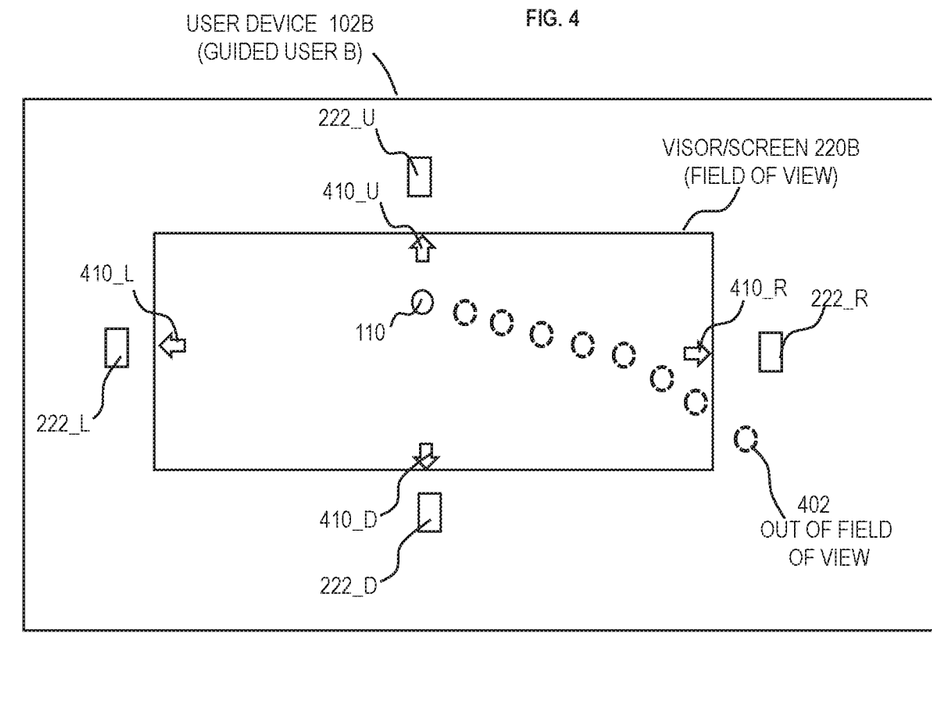
FIG. 4 depicts an example display screen of the receiving user device which displays a technique to guide the user to view the object according to embodiments of the invention.

At block 310, the user device 102B is configured to guide user B to the direction to view the object 110 from location B. There are various techniques for helping user B to find and view from location B the same object 110 (being viewed and/or previously viewed by user A at location A). As one technique, FIG. 4 depicts an example display of guiding user B to view the object 110 according to embodiments of the invention. After translating the remote viewing information (i.e., location and/or orientation information of the user A at location A and the viewing direction information of user A viewing object 110) into local viewing information for user device 102B of user B at location B, the visors/screens 220B of user B can be utilized to visually instruct user B how to view the object 110. For example, initially, the object 110 can be out of the field of view of the visor/screen 220B (which can coincides with being out of the field of view of the visual sensors 210B) such that initially the object 110 is depicted as out of the field of view 402 (shown as a dashed circle). Out of the field of view 402 is only illustrated for explanation purposes but would not be seen by use B. Therefore, at this point, user B cannot view (see) the object 110. To guide the user B, the user device 102B can have up, down, left, right arrows 410_U, 410_D, 410_L, 410_R (generally referred to as arrows 410). The arrows 410 can be one or more light sources such as LEDs positioned on and/or near the visor/screen 220B so that the user B can be directed to turn his head in the illuminated direction, which correspondingly directs the user to view the object 110, as directed by the processor 202B. The arrows 410 can be superimposed arrows projected on the visor/screen 220B for guiding the user to view the object 110. Referring to FIG. 4, the object is out of the field of view as designed by label 402. Accordingly, the user device 102B (via processor 202B executing instructions) is configured to illuminate the right arrow 410_R which indicates that the user B should turn his head to the right relative to his position at location B. Additionally, the user device 102B is configured to illuminate the down arrow 410_D which indicates that the user should tilt his head down relative to his position at location B. This will guide the user B utilizing user device 102B to the same object 110 being viewed and/or previously viewed by user A utilizing user device 102B. The trailing of dashed circles represent the object 110 being seen by user B as he follows the cues (i.e., turns his head or body accordingly) being given by the arrows 410. Additionally and/or alternatively, the guidance can be tactile, and the user device 102B includes various vibration devices 222B positioned on the user device 102B in order to guide the user B to turn his head in the direction of the vibration. For example, the vibration devices 222B can be positioned up, down, left, and right and be respectively designated as vibration device 222_U, 222_D, 222_L, and 222_R as depicted in FIG. 4. As noted above, the object is initially out of the field of view as designed by label 402. Accordingly, the user device 102B (via processor 202B executing instructions) is configured to vibrate the right vibration device 222_R which indicates that the user B should turn his head to the right relative to his position at location B. Additionally, the user device 102B is configured to vibrate the down vibration device 222_D which indicates that the user should tilt his head down relative to his position at location B. This will guide the user B utilizing user device 102B to the same object 110 being viewed and/or previously viewed by user A. Additionally and/or alternatively, the guidance can be audible, and verbal commands (via the processor 202B executing instructions) can be played through the speakers of the user I/O device 208B to instruct the user B to turn his head to the right and to tilt his head down.

Figure 5:
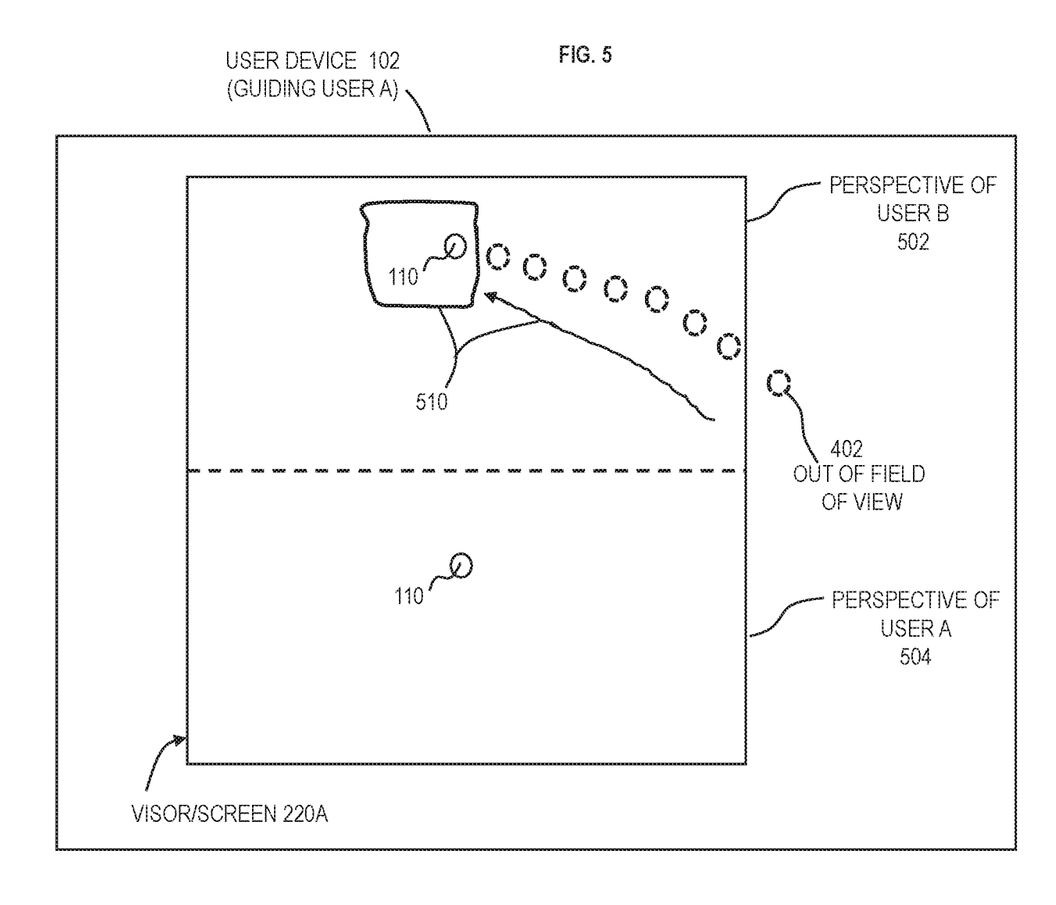
FIG. 5 depicts an example display screen of the guiding user device which displays both the view of the guiding user and user being guided according to embodiments of the invention.

As additional techniques for helping user B to find and view from location B the same object 110 (being viewed and/or previously viewed by user A at location A), FIG. 5 depicts the visors/screens 220A which display both the view of user A viewing the object 110 and the view of user B who needs to find the object 110 according to embodiments of the invention. Some details of FIG. 4 are omitted from FIG. 5 it should be appreciated that the details are included. The visor/screen 220A of user device 102A displays the perspective view 504 of user A and the perspective view 502 of user B such that user A can see them both on his user device 102A. The same two perspective views 502 and 504 can be displayed on the user device 102B of user B although not shown. The user device 102B of user B is transmitting and updating the view of visor/screen 102A to the user device 102A of user A, and vice versa. Using the user I/O devices 208A and 208B (e.g., microphone, speaker, etc.), user A can give user B verbal commands to turn his head to the right and turn his head down in order to view the object 110 until user A sees the object 110 the perspective view 502 of user B on user device 102A of user A. Additionally and/or alternatively, user A can make annotations 510 which can be seen by user A on the perspective view 502 of user B, and these annotations can guide user B to view the object 110; concurrently (in real-time or near real-time), it is noted that user B utilizing user device 102B sees the same annotations 510 on the visor/screen 220B of user B.

Figure 6:
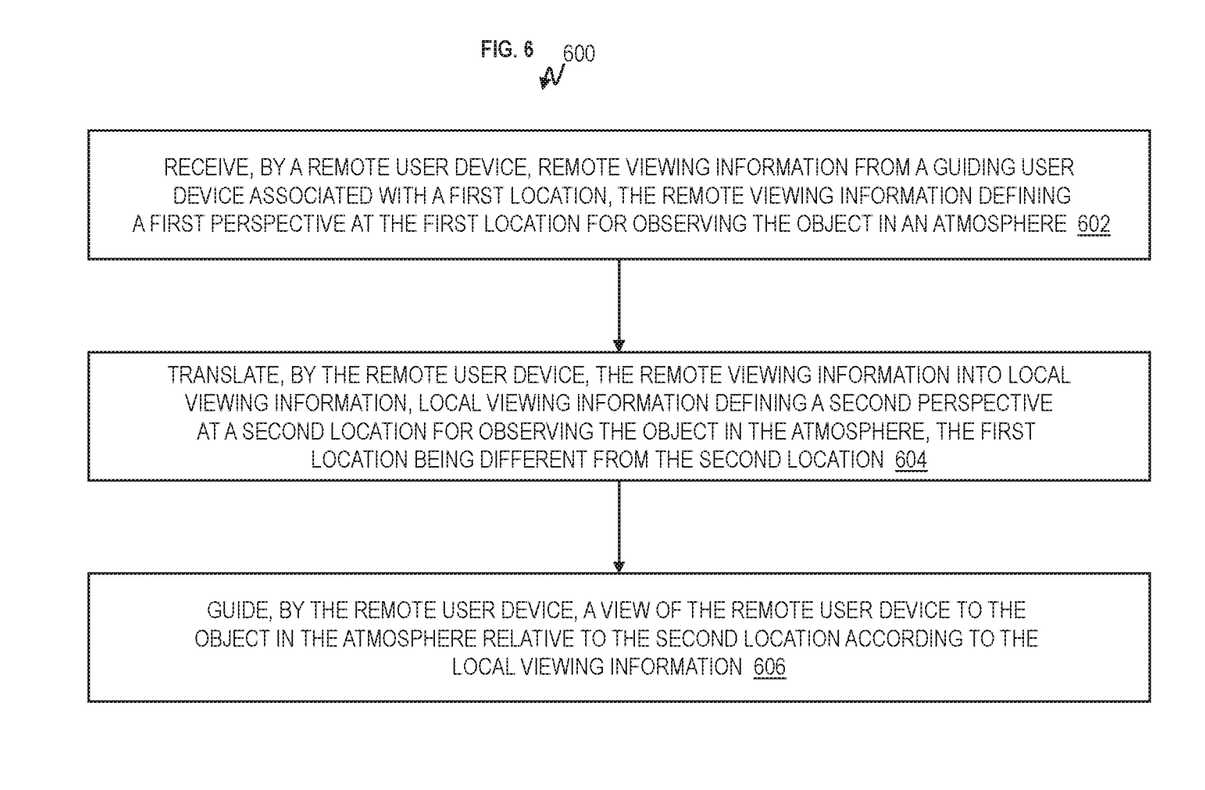
FIG. 6 depicts a flowchart of a computer-implemented method for remote guidance to observe an object according to embodiments of the invention.

FIG. 6 is a flowchart of a computer-implemented method for remote guidance to observe an object according to embodiments of the invention. At block 602, a remote user device 102B is configured to receive remote viewing information from a guiding user device 102A associated with a first location A, the remote viewing information defining a first perspective at the first location A for observing (by the guiding user device 102A) the object 110 in an atmosphere.

At block 604, the remote user device 102B is configured to translate the remote viewing information (of user device 102A) into local viewing information (of user device 102B), the local viewing information defining a second perspective at a second location B for observing (by the remote user device 102B) the object 110 in the atmosphere, the first location A being different from the second location B. At block 606, the remote user device 102B is configured to guide a view (e.g., on visor/screen 220B) of the remote user device 102B to the object 110 in the atmosphere relative to the second location B according to the local viewing information.

Further, the remote viewing information comprises location orientation information of the guiding user device 102A at the first location A. The remote viewing information further comprises viewing information of the guiding user device 102A at the first location A, the viewing information comprising a viewing angle (e.g., azimuth) of the guiding user device 102A required for observing the object 110 in the atmosphere. The viewing information (and/or location orientation information) of the guiding user device 102A also contains temporal reference (as determined by processors 202A), yielding a temporal-spatial coordinate of object 110 with respect to user A by setting the date and time-stamp of when the observation of object 110 occurred.

The local viewing information comprises a translated viewing angle (e.g., azimuth) associated with the remote user device 102B at the second location B viewing the object 110 in the atmosphere (which was based on temporal-spatial coordinate from user A). Guiding, by the remote user device 102B, the view of the remote user device 102B to the object 110 in the atmosphere relative to the second location B according to the local viewing information comprises initiating one or more cues (e.g., illuminating one or more arrows 410, vibrating one or more vibration devices 222, etc., as depicted in FIG. 4) to direct the view of the remote user device 102B to the object 110. Guiding, by the remote user device 102B, the view of the remote user device 102B to the object 110 in the atmosphere relative to the second location B according to the local viewing information comprises providing verbal instructions to direct the view of the remote user device 102B to the object 110. Guiding, by the remote user device 102B, the view of the remote user device 102B to the object 110 in the atmosphere relative to the second location B according to the local viewing information comprises generating annotations (as depicted in FIG. 5) on the remote user device 102B to direct the view of the remote user device 102B to the object 110.

The remote user device 102B is configured to transmit the view (e.g., on the screen/visor 220B) of the remote user device 102B to the guiding user device 102A. The remote user device 102B is configured to receive annotations (from the guiding user device 102A) to be generated on the remote user device 102B, the annotations directing the view of the remote user device 102B to the object 110 (in real-time or near real-time given a transmission delay). The remote user device 102B is configured to receive verbal instructions from the guiding user device 102A (in real-time or near real-time given a transmission delay) to direct the view of the remote user device 102B to the object 110.

Figure 7:
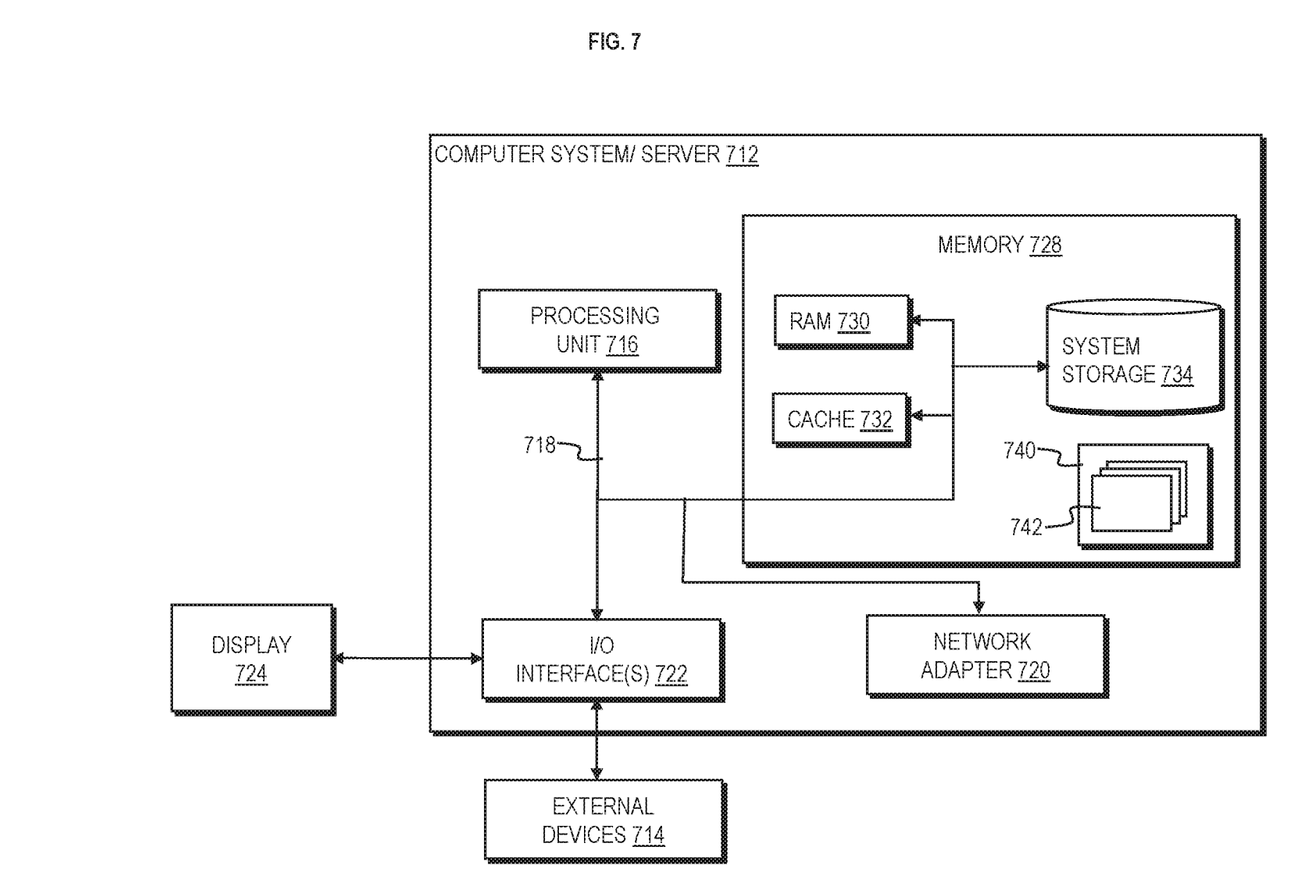
FIG. 7 depicts a schematic of an example computing system having elements and functions which operate as discussed herein in FIGS. 1-6 and 8 according to embodiments of the invention.

FIG. 7 depicts a schematic of an example computing system 712 according to embodiments of the present invention. The computer system/server 712 can be operational with numerous other general purpose or special purpose computing system environments or configurations. The computer system/server 712 can be representative of various types of computer systems on which communication functions can run in the communication system/network 100. The functions and capabilities of computing system 712 can be utilized in FIGS. 1-6 to implement features of the user devices 102A and 102B, etc., according to embodiments of the invention.

Examples of well-known computing systems, environments, and/or configurations that can be representative of and/or include elements of computer system/server 712 include, but are not limited to, personal computer systems, phones (e.g., cell phones, smartphones, etc.), server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 712 may include, but are not limited to, one or more processors or processing units 716, a system memory 728, and a bus 718 that couples various system components including system memory 728 to processor 716. Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media. The system memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. Memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for remote guidance to observe an object, the method comprising:
    receiving, by a remote user device, remote viewing information from a guiding user device associated with a first location, the remote viewing information defining a first perspective at the first location for observing the object in an atmosphere;
    translating, by the remote user device, the remote viewing information into local viewing information, the local viewing information defining a second perspective at a second location for observing the object in the atmosphere, the first location being different from the second location;
    guiding, by the remote user device, a view of the remote user device to the object in the atmosphere relative to the second location according to the local viewing information, the guiding comprising providing verbal instructions received from the guiding user device observing the object in the atmosphere from the first perspective to direct the view of the remote user device to the object, the guiding further comprising generating annotations on the remote user device to direct the view of the remote user device to the object, the annotations marking the object, the marking having been created by a user of the guiding user device; and
    displaying on a display screen of the remote user device a split screen in which one area of the display screen displays the view of the remote user device while another area of the display screen concurrently displays a separate view of the guiding user device, wherein the separate view of the guiding user device is a result of transmitting and updating from the guiding user device to the display screen of the remote user device.

2. The computer-implemented method of claim 1, wherein the remote viewing information comprises location orientation information of the guiding user device at the first location.

3. The computer-implemented method of claim 2, wherein the remote viewing information further comprises viewing information of the guiding user device at the first location, the viewing information comprising a viewing angle of the guiding user device observing the object in the atmosphere.

4. The computer-implemented method of claim 1, wherein the local viewing information comprises a translated viewing angle associated with the remote user device at the second location viewing the object in the atmosphere.

5. The computer-implemented method of claim 1, wherein guiding, by the remote user device, the view of the remote user device to the object in the atmosphere relative to the second location according to the local viewing information comprises initiating one or more cues to direct the view of the remote user device to the object.

6. The computer-implemented method of claim 1, further comprising transmitting the view of the remote user device to the guiding user device from which the remote viewing information has been received.

7. The computer-implemented method of claim 6, further comprising receiving from the guiding user device the annotations to be generated on the remote user device, the annotations directing the view of the remote user device to the object.

8. A device for remote guidance to observe an object, the device comprising:
 a processor;
 a display screen; and
 memory coupled to the processor and comprising computer-executable instructions that, when executed by the processor, cause the processor to perform a method comprising:
 receiving, by the processor, remote viewing information from a guiding user device associated with a first location, the remote viewing information defining a first perspective at the first location for observing the object in an atmosphere;
 translating, by the processor, the remote viewing information into local viewing information, the local viewing information defining a second perspective at a second location for observing the object in the atmosphere, the first location being different from the second location;
 guiding, by the processor, a view of the device to the object in the atmosphere relative to the second location according to the local viewing information, the guiding comprising providing verbal instructions received from the guiding user device observing the object in the atmosphere from the first perspective to direct the view of the device to the object, the guiding further comprising generating annotations on the device to direct the view of the device to the object, the annotations marking the object, the marking having been created by a user of the guiding user device; and
 displaying on the display screen of the device a split screen in which one area of the display screen displays the view of the device while another area of the display screen concurrently displays a separate view of the guiding user device, wherein the separate view of the guiding user device is a result of transmitting and updating from the guiding user device to the display screen of the device.

9. The device of claim 8, wherein the remote viewing information comprises location orientation information of the guiding user device at the first location.

10. The device of claim 9, wherein the remote viewing information further comprises viewing information of the guiding user device at the first location, the viewing information comprising a viewing angle of the guiding user device observing the object in the atmosphere.

11. The device of claim 8, wherein the local viewing information comprises a translated viewing angle associated with the device at the second location viewing the object in the atmosphere.

12. The device of claim 8, wherein guiding, by the processor, the view of the device to the object in the atmosphere relative to the second location according to the local viewing information comprises initiating one or more cues to direct the view of the device to the object.

13. The device of claim 8, wherein the method further comprises transmitting the view of the device to the guiding user device from which the remote viewing information has been received.

14. The device of claim 13, wherein the method further comprises receiving the annotations to be generated on the device, the annotations directing the view of the device to the object.

15. A computer program product for remote guidance to observe an object, the computer program product comprising a computer readable storage medium having program instructions embodied therewith, wherein the computer readable storage medium is not a transitory signal per se, the program instructions executable by a remote user device to cause the remote user device to perform a method comprising:
 receiving, by the remote user device, remote viewing information from a guiding user device associated with a first location, the remote viewing information defining a first perspective at the first location for observing the object in an atmosphere;
 translating, by the remote user device, the remote viewing information into local viewing information, the local viewing information defining a second perspective at a second location for observing the object in the atmosphere, the first location being different from the second location;
 guiding, by the remote user device, a view of the remote user device to the object in the atmosphere relative to the second location according to the local viewing information, the guiding comprising providing verbal instructions received from the guiding user device observing the object in the atmosphere from the first perspective to direct the view of the remote user device to the object, the guiding further comprising generating annotations on the remote user device to direct the view of the remote user device to the object, the annotations marking the object, the marking having been created by a user of the guiding user device; and
 displaying on a display screen of the remote user device a split screen in which one area of the display screen displays the view of the remote user device while another area of the display screen concurrently displays a separate view of the guiding user device, wherein the separate view of the guiding user device is a result of transmitting and updating from the guiding user device to the display screen of the remote user device.

* * * * *